US009277100B2

(12) United States Patent
Zappe et al.

(10) Patent No.: US 9,277,100 B2
(45) Date of Patent: Mar. 1, 2016

(54) METHOD TO CONTROL A COLOR PRINTER OR COLOR COPIER WITH THE AID OF ADDITIONAL PRINTED POSITIONING MARKINGS

(71) Applicants: Karl Zappe, Schwindegg (DE); Stephan Pudelko, Poing (DE)

(72) Inventors: Karl Zappe, Schwindegg (DE); Stephan Pudelko, Poing (DE)

(73) Assignee: Océ Printing Systems GmbH & CO. KG, Poing (DE)

( * ) Notice: Subject to any disclaimer, the term of this patent is extended or adjusted under 35 U.S.C. 154(b) by 36 days.

(21) Appl. No.: 14/132,253

(22) Filed: Dec. 18, 2013

(65) Prior Publication Data

US 2014/0168678 A1   Jun. 19, 2014

(30) Foreign Application Priority Data

Dec. 18, 2012  (DE) .......................... 10 2012 112 486

(51) Int. Cl.
*H04N 1/60*   (2006.01)

(52) U.S. Cl.
CPC .................................. *H04N 1/6033* (2013.01)

(58) Field of Classification Search
CPC ............ H04N 1/6033; H04N 1/00381; H04N 1/00379; H04N 1/60
USPC .......... 358/1.18, 1.9, 1.5, 2.1, 1.12, 518, 538, 358/504; 382/167; 399/301, 372, 371
See application file for complete search history.

(56) References Cited

U.S. PATENT DOCUMENTS

| 4,596,468 | A | * | 6/1986 | Simeth ......................... 356/400 |
| 5,247,462 | A | | 9/1993 | Blasius et al. |
| 5,802,973 | A | | 9/1998 | Mueller et al. |
| 8,107,838 | B2 | | 1/2012 | Dorfner |
| 2003/0063275 | A1 | * | 4/2003 | Hubble, III ............... G01J 3/50 356/319 |
| 2003/0189610 | A1 | * | 10/2003 | Darby et al. .................... 347/19 |
| 2005/0191072 | A1 | | 9/2005 | Okano |
| 2007/0181027 | A1 | * | 8/2007 | Kanazawa .................... 101/484 |
| 2009/0162111 | A1 | | 6/2009 | Murayama |

FOREIGN PATENT DOCUMENTS

| DE | 4014708 A1 | 12/1991 |
| DE | 4218762 A1 | 12/1993 |

(Continued)

*Primary Examiner* — Jamares Q Washington
(74) *Attorney, Agent, or Firm* — Schiff Hardin LLP

(57) ABSTRACT

In a method to control a printer or copier, a color measurement unit is provided for determining a measurement value of a print marking in a measurement region of color measurement unit. The print marking is printed on the printing substrate web. In addition a positioning marking is also printed on the printing substrate web in a predetermined position relative to the print marking in order to determine a relative position between the print marking and the measurement region of the color measurement unit. The positioning marking comprises at least two partial regions printed in different colors, the partial regions being formed such that a determined color value of the positioning marking changes given a movement of the measurement region of the color measurement unit transverse to a movement direction of the printing substrate web. A real color value is determined with the color measurement unit if the measurement region of the color measurement unit is arranged in a region of the positioning marking. A relative position between the print marking and the color measurement unit is determined depending on a real color value. The measurement value of the print marking is determined and the printer or copier is controlled depending on the measurement value of the print marking.

12 Claims, 4 Drawing Sheets

(56) References Cited

FOREIGN PATENT DOCUMENTS

| DE | 4218764 | A1 | 12/1993 |
| DE | 4235393 | A1 | 4/1994 |
| DE | 19826333 | A1 | 4/1999 |
| DE | 10250592 | A1 | 5/2004 |
| DE | 102008049908 | A1 | 4/2010 |
| GB | 2271744 | A | 4/1994 |
| JP | 2006030598 | A | 2/2006 |
| JP | 2007232763 | A | 9/2007 |
| JP | 2009069628 | A | 4/2009 |

* cited by examiner

FIG. 5
FIG. 6
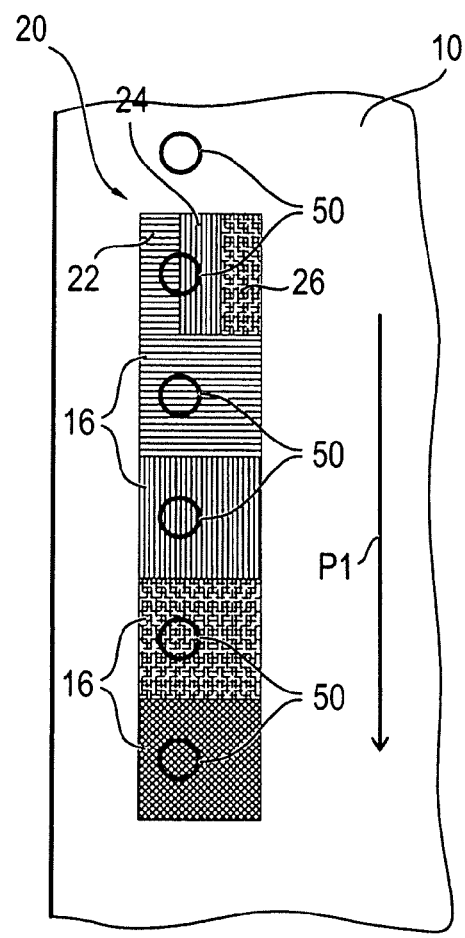
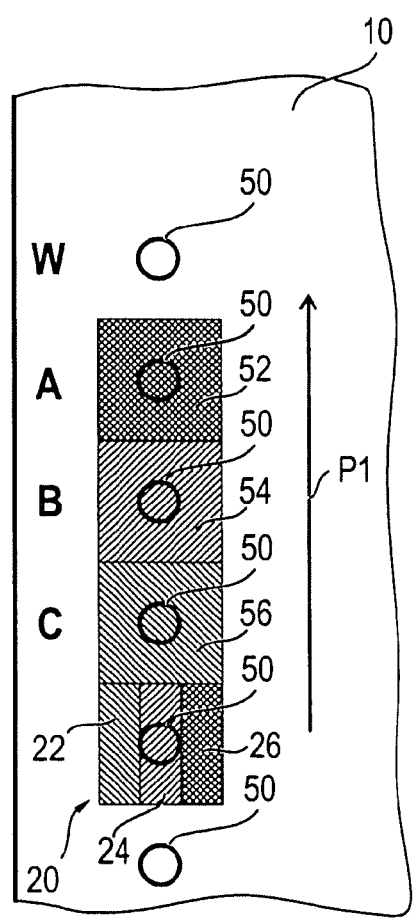
FIG. 7
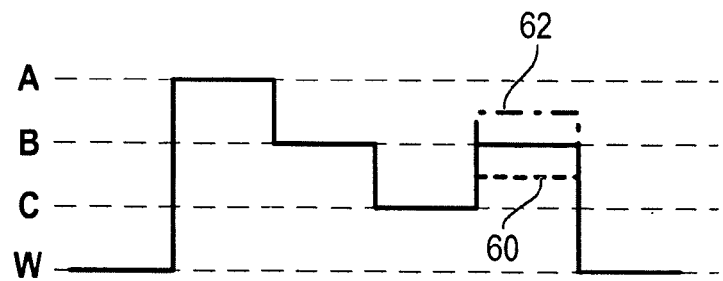

FIG. 8
FIG. 9
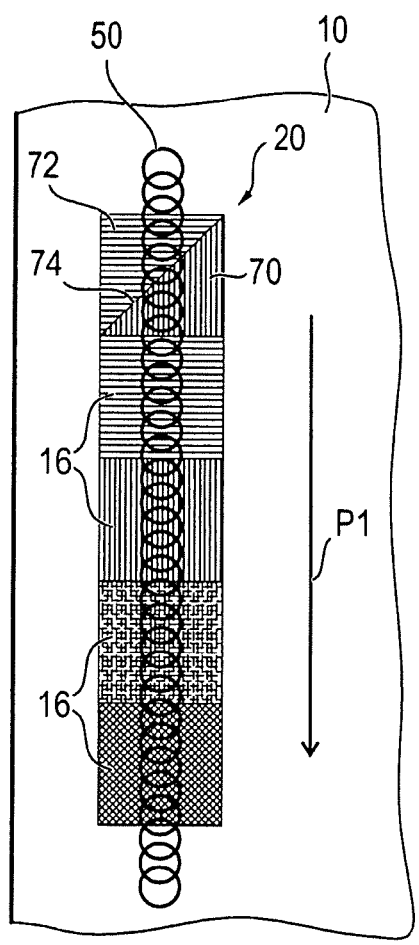
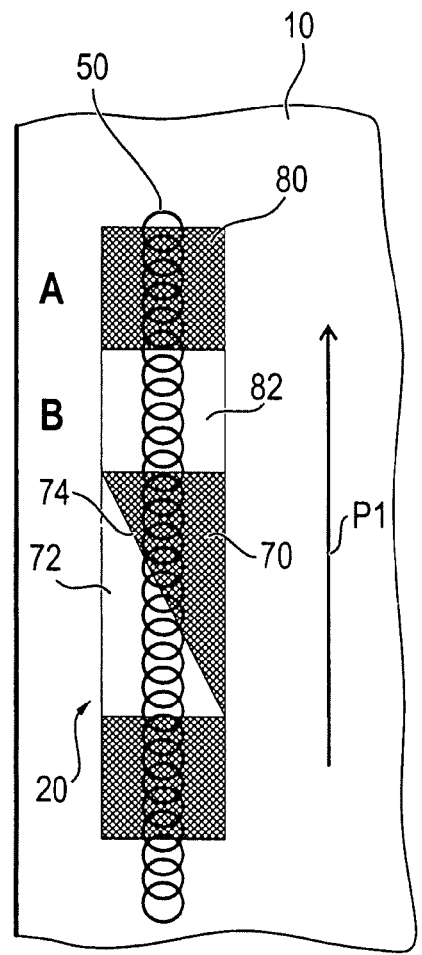
FIG. 10
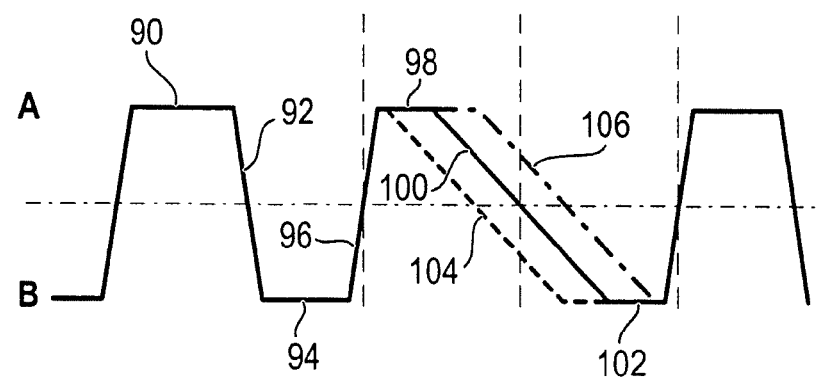

METHOD TO CONTROL A COLOR PRINTER OR COLOR COPIER WITH THE AID OF ADDITIONAL PRINTED POSITIONING MARKINGS

BACKGROUND

The disclosure concerns a method to control a color printer or color copier in which at least one print marking to control the color printer or color copier is printed on a printing substrate web moving in the movement direction. With the aid of a color measurement sensor unit in a measurement region of this color sensor unit a measurement value of the print marking is determined if the print marking is arranged in the region of the measurement region of the color measurement sensor unit. The controller of the color printer or color copier then takes place depending on this measurement value.

A widespread method to monitor the print quality of a color printer or color copier is, for example, to print markings in the margin region of the printing substrate web in addition to the actual print image, and to detect these with the aid of sensors. Conclusions about the state of the color printer or color copier can be drawn via the information obtained in these measurements. In particular, multiple print markings are applied in the different print colors that are used, wherein the information obtained from them is used for a color regulation (closed loop color monitoring).

For this, the applied print markings for a color sensor unit are detected. This color measurement sensor unit exposes the printing substrate web and calculates a measurement value from the measured reflections integral over a measurement region of the color measurement sensor unit. This measurement value—in particular a color value—is then compared with the preset desired values. The color regulation then takes place depending on the result of this real/desired comparison.

A requirement for a correct color measurement is that—as shown in FIG. 1—the measurement region 12 of the color measurement sensor unit 14 is situated completely on the print marking 16 applied on the printing substrate web 10. In contrast to this, if the measurement region 12 is arranged alongside the print marking 16 (as shown in FIG. 2) or is positioned only partially on the print marking 16 (as depicted in FIG. 3), although the color measurement sensor 14 delivers a measurement value it does not correspond to the actual quality of the print marking 16. Since the unprinted printing substrate is measured as well in this case, at least in part, the integral measurement value determined across the entire measurement region is adulterated. An incorrect color value measurement thus takes place.

Various methods are known in order to avoid such a false measurement. One possibility is to provide an additional optically resolving sensor unit (a camera, for example) in addition to the color measurement sensor unit that is not optically resolving, with the aid of which additional optically resolving sensor unit the position between the color measurement sensor unit and the print marking can be determined. The information obtained in such a manner about the relative position between the color measurement sensor unit and the print marking can then be taken into account in the evaluation of the obtained measurement values.

An additional possibility is that the print markings and the color measurement sensor unit are manually positioned by the operator. The print markings are hereby applied widely such that deviations due to printing substrate web travel fluctuations do not lead to incorrect measurements, and thus do not lead to a malfunction. In this it is disadvantageous that such wide print markings require a great deal of toner or ink and are space-intensive, and limit the effective usable print width.

A method to control a printer is known from the document U.S. Pat. No. 8,107,838 B2, in which print markings are applied to the printing substrate web and a time signal is detected with the aid of a sensor. A maximum value and a minimum value of this sensor signal are determined, based on which a plausibility check of the obtained results is implemented.

The document DE 10 2008 049 908 A1 describes a method to generate a detection signal by means of a detection device to detect a print marking located on a printing substrate web. The detection signal is hereby determined from at least two different color signals.

SUMMARY

It is an object to specify a method to control a color printer or color copier in which errors due to fluctuations of the relative position between the color measurement sensor unit and the printing substrate web are avoided, or at least minimized.

In a method to control a printer or copier, a color measurement unit is provided for determining a measurement value of a print marking in a measurement region of color measurement unit. The print marking is printed on the printing substrate web. In addition a positioning marking is also printed on the printing substrate web in a predetermined position relative to the print marking in order to determine a relative position between the print marking and the measurement region of the color measurement unit. The positioning marking comprises at least two partial regions printed in different colors, the partial regions being formed such that a determined color value of the positioning marking changes given a movement of the measurement region of the color measurement unit transverse to a movement direction of the printing substrate web. A real color value is determined with the color measurement unit if the measurement region of the color measurement unit is arranged in the region of the positioning marking. A relative position between the print marking and the color measurement unit is determined depending on a real color value. The measurement value of the print marking is determined and the printer or copier is controlled depending on the measurement value of the print marking.

BRIEF DESCRIPTION OF THE DRAWINGS

FIG. 5 is a depiction of a section of a printing substrate web according to a first embodiment;

FIG. 6 is a depiction of a section of a printing substrate web with a positioning marker according to a second embodiment;

FIG. 7 is a depiction of a signal curve of a color measurement sensor unit upon measurement of the printing substrate web according to FIG. 6;

FIG. 8 is a depiction of a section of a printing substrate web according to a third embodiment;

FIG. 9 is a depiction of a section of a printing substrate web according to a fourth embodiment; and FIG. 10 is a depiction of a signal curve of the color measurement sensor unit upon measurement of the printing substrate web according to FIG. 9.

DESCRIPTION OF PREFERRED EXEMPLARY EMBODIMENTS

Figure 1:
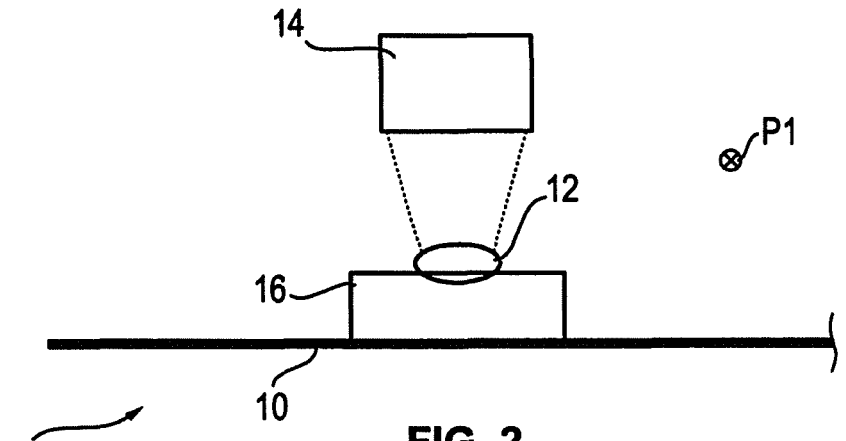
FIG. 1 is a prior art depiction of a printing substrate web and a color measurement sensor unit in a desired arrangement.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

According to an exemplary embodiment, in addition to the print markings used for the control of the color printer or color copier (in particular for the color regulation) at least one additional positioning marking is applied on the printing substrate web for the determination of the relative position between the print marking and the color measurement sensor unit. This positioning marking is designed such that it includes at least two partial regions that are differentiable from one another via at least one differentiation criterion measurable with the aid of the color measurement sensor unit. With the aid of the color measurement sensor unit, at least one real value of this differentiation criterion is determined when the positioning marker is arranged in the region of the measurement region of the color measurement sensor unit. The relative position between the print marking and the color measurement sensor unit is determined depending on this real value.

Given a known, predetermined arrangement between the print marking and the positioning marking, the relative position between the print marking and the color measurement sensor unit can also be determined via the knowledge about the relative position between the positioning marker and the color measurement sensor unit. It can thus likewise be determined whether the measurement region of the color measurement sensor unit completely detects the print marking or whether this is arranged at least partially adjacent to the print marking. If the relative position between the print marking and the color measurement sensor unit is thus known, this can be taken into account in the evaluation of the measurement value of the print marking that is determined by the color measurement sensor unit. In particular, if the measurement region of the color measurement sensor unit is not completely positioned on the print marking upon determination of the measurement value of the print marking, the obtained measurement value is accordingly not taken into account, such that no malfunction takes place. Alternatively, the obtained measurement value can also not be taken into account at all insofar as the measurement region is not entirely positioned on the print marking.

The control of the color printer or color copier—in particular the color regulation—that is realized via the print markings is thus possible with a high precision, independent of printing substrate web travel fluctuations. Via the application of the positioning marking and its detection with the color measurement sensor unit (which is necessary anyway for the control and color regulation), it is also achieved that no additional sensors are necessary for the position determination between printing substrate web and color measurement sensor unit, which is different than in a known method. A particularly simple and cost-effective design is thus achieved.

Furthermore, it is also not necessary to provide printing substrate markings so that the printing substrate demand is reduced. Given manual methods, inevitable errors can be avoided relative to methods in which a manual positioning between printing substrate web and color measurement sensor unit takes place. In particular, a fully automatic process is achieved.

The color measurement sensor unit is in particular a densitometer which advantageously has different measurement channels for the different primary print colors that are used. The two partial regions of the positioning marker are inked in different print colors, such that different intensity values are measured in the different color measurement channels depending on in which detail regions of the measurement region the color measurement sensor unit is respectively arranged. Via the intensity measured in the different color measurement channels, it can thus be determined how the relative position between color measurement sensor unit and the positioning marker (and thus between the color measurement sensor unit and the print marker) is provided.

Alternatively, instead of a densitometer a spectrally measuring color measurement apparatus or a three-region measurement apparatus can also be used.

The partial regions of the positioning marker are in particular designed such that each partial region is larger than the measurement region of the color measurement sensor unit (what is known as the measurement spot), such that the relative position between the color measurement sensor unit and the positioning marker can be determined precisely. Alternatively, the partial regions can also be smaller than or the same size as the measurement spot.

In a particularly preferred embodiment, the positioning marker includes more than two partial regions (in particular three partial regions) that are inked in the different print colors that are used. An even more precise determination of the relative position between the positioning marker and the color measurement sensor unit is accordingly possible.

The partial regions are in particular formed in the shape of stripes, wherein these stripes are directed in the direction of the movement of the printing substrate web.

It is particularly advantageous if the print markings and the positioning markings are printed one after another in a successive row so that only a slight variation of the position of the printing substrate web transverse to the movement direction is possible between the point in time of the detection of the positioning marker and the point in time in which the print markings are arranged in the measurement region of the color measurement sensor unit.

The real measurement value of the differentiation criterion of the positioning marker that is determined with the aid of the color measurement sensor unit is in particular compared with multiple predetermined values, wherein each of these predetermined values reflects the value that the color measurement sensor unit would deliver if its measurement region is positioned precisely in one of the partial regions of the positioning marker.

Which of the partial regions of the positioning markers are covered how far from the measurement region of the color measurement sensor unit can thus be determined via the comparison with the determined real measurement value and the predetermined values. The position between the positioning marker and the color measurement sensor unit can thus be determined in a simple manner.

In particular, a control of the position of the color measurement sensor unit transverse to the movement direction of the printing substrate web (for example with the aid of a traverse) takes place on the basis of the determined position between the print marking and the color measurement sensor unit.

An additional aspect of the exemplary embodiment concerns a color printer or color copier to print to a printing substrate web, which color printer or color copier comprises: a printing unit to print to the printing substrate web; a color measurement sensor unit with a measurement region; and a control unit to control the color printer or color copier. The printing unit prints at least one print marking to control the color printer or color copier onto the printing substrate web, wherein the color measurement sensor unit determines in its measurement region a measurement value of this print marking when said print marking is arranged in the region of the measurement region of the color measurement sensor unit. The control unit controls the color printer or color copier depending on this determined measurement value. In particular, a color regulation is hereby implemented.

In addition to the at least one print marking, the printing unit prints at least one positioning marking to determine the relative position between the print marking and the color measurement sensor unit onto the printing substrate web, wherein this positioning marking includes at least two partial regions that can be differentiated from one another via at least one differentiation criterion that can be measured with the aid of the color measurement sensor unit. With the aid of the color measurement sensor unit, at least one real value of the differentiation criterion is determined when the positioning marker is arranged in the region of the measurement region of the color measurement sensor unit. The control unit determines the relative position between the print marking and the color measurement sensor unit depending on this real value.

Additional features and advantages of the exemplary embodiments result from the following description and in connection with the drawing figures.

A schematic depiction of a printing substrate web 10 is shown in prior art FIG. 1, for example as this is used in color printers or color copiers. The printing substrate web 10 is hereby driven in a movement direction P1 while it is being printed with a print image (not shown) with the aid of a printing unit (likewise not shown). To control the color printer or color copier, in a defined region 18 of the printing substrate web 10 print markings are printed that are measured with the aid of sensors. Using the information obtained from the sensors, conclusions about the print quality can be drawn that are taken into account accordingly in the control of the color printer or color copier. In particular, for color regulation print markings 16 are applied in the various print colors that are used, in particular in black, yellow, magenta and cyan and additional special colors. A color value of each print marking 16 in a measurement region 12 of the color measurement sensor unit 14 is respectively determined with the aid of the color measurement sensor unit 14 (for example a densitometer or a spectrally measuring color measurement apparatus). The measurement region 12 is the measurement spot (measurement area) of the color measurement sensor unit 14 on the printing substrate. The regulation of the corresponding color can then take place via a comparison with a predetermined desired value.

For this, the color measurement sensor unit 14 measures the color value as an integral across the entire measurement region 12. In order to achieve a correct color regulation, it is thus necessary that the measurement region 12 is arranged entirely on the print marking 16 (as this is shown in FIG. 1).

Figure 2:
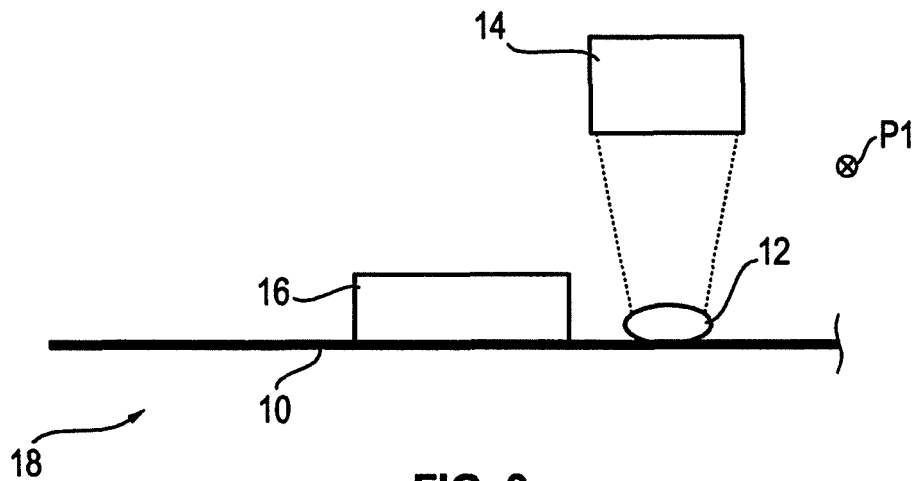
FIG. 2 is a prior art depiction of the printing substrate web and the color measurement sensor unit in an arrangement deviating from the desired arrangement.

However, during the printing operation of the color printer or color copier it can occur that the relative arrangement between the color measurement sensor unit 14 and the printing substrate web 10 changes (in particular orthogonal to the movement direction P1) so that the measurement region 14 is no longer arranged entirely on the print marking 16. Such a state is shown in prior art FIG. 2, in which the measurement region 12 lies entirely adjacent to the print marking. The color measurement sensor unit 14 thus measures the color value of the unprinted printing substrate in this region, such that a regulation of the color of the print marking 16 is not possible, or in incorrect regulation takes place based on incorrectly determined measurement values.

Figure 3:
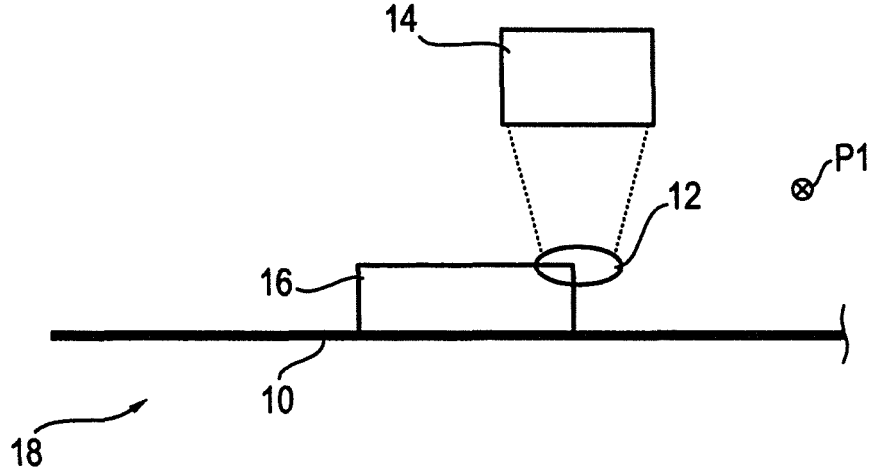
FIG. 3 is an additional prior art depiction of a printing substrate web and a color measurement sensor unit in an additional arrangement deviating from the desired arrangement.

In the state shown in prior art FIG. 3, in which the measurement region 12 is only partially arranged on the print marking 16, the determined measurement value also does not reflect the actual quality of the print marking 16, such that in this case as well a reliable color regulation is not possible.

It is thus necessary, according to the exemplary embodiment herein, to know the relative positioning between the color measurement sensor unit 14 and the printing substrate web 10. In this case, for example, the color measurement sensor unit 14 can be controlled (with the aid of a traverse, for example) such that the desired alignment between the color measurement sensor unit 14 and the printing substrate web 10 is reestablished. Alternatively, the determined measurement value of the print marking 16 can also be compensated upon its evaluation by the errors produced by the incorrect relative arrangement. Alternatively, it is likewise possible to not consider the determined measurement value at all in the control insofar as it has been determined that the relative alignment of the color measurement sensor unit 14 and the print marking 16 deviates from the desired arrangement.

Figure 4:
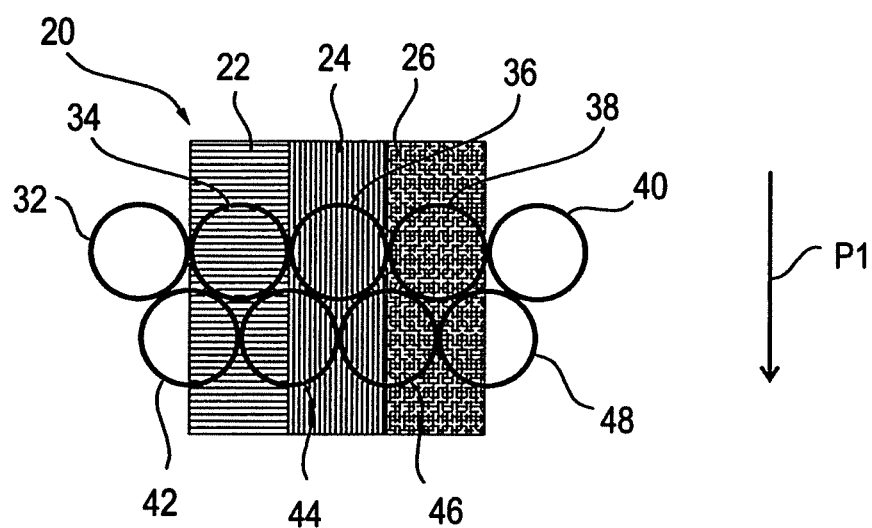
FIG. 4 is a depiction of a positioning marker according to a first embodiment.

For the determination of the relative position between the print marking 16 and the color measurement sensor unit 14, in addition to the print markings 16 used for the color control a positioning marking 20 as shown in FIG. 4 is printed in the defined region 18, with the aid of which the relative position between the positioning marking 20 and the color measurement sensor unit 14 can be determined. Due to the known, fixed, predetermined relative arrangement between the positioning marking 20 and the print marking 16, the relative arrangement between the color measurement sensor unit 14 and the print marking 16 can thus be reliably concluded via the known relative arrangement between the positioning marking 20 and the color measurement sensor unit 14, such that this relative positioning can (as described in the preceding) be used accordingly in the evaluation of the obtained measurement values for the color regulation.

A schematic depiction of a positioning marking 20 according to a first embodiment is presented in FIG. 4. The positioning marking 20 comprises three stripe-shaped partial regions 22 through 26 that are arranged parallel to one another and parallel to the movement direction P1 of the printing substrate web. Each of the partial regions 22 through 26 is printed in one of the print colors. The circles 32 through 48 symbolize different positions of the measurement region 12 relative to the positioning marking 20 that can result via deviations of the printing substrate web direction relative to the color measurement sensor unit 14.

A color measurement sensor unit 14 that is sensitive to the colors cyan, magenta and yellow, with corresponding measurement channels, is assumed in the following embodiments.

Given the relative position shown by the circle 32, with the aid of the color measurement sensor unit 14 a very large reflection can be measured since the measurement region 12 is arranged outside of the positioning marking 20 and the white paper is thus measured. All color measurement channels of the color measurement sensor unit 14 accordingly deliver a low measurement value.

Given the relative position indicated by the circle 34, the measurement region 12 is arranged exclusively in the cyan-colored partial region 22, such that the cyan measurement channel of the color measurement sensor unit 14 delivers a high measurement value, in contrast to which no measurement values or only very low measurement values are measured in the other color measurement channels.

In the arrangement indicated by the circle 36, the measurement region 12 is arranged entirely in the magenta-colored partial region 24, such that a high measurement value is determined in the magenta measurement channel, in contrast to which a small measurement value or no measurement value at all is determined in the other color measurement channels.

A high measurement value is accordingly achieved given the relative arrangement in the yellow measurement channel that is indicated by the circle 38, in contrast to which no measurement value or only a slight measurement value is determined in the other color measurement channels.

Given the arrangement indicated by the circle 40, the positioning marking 20 is arranged outside of the positioning marking 20, such that—as given the arrangement indicated by the circle 32—a high reflection and a low measurement value are determined in all color measurement channels.

Given the arrangement indicated by the circle 42, the measurement region 12 of the color measurement sensor unit 14 is arranged half on the cyan-colored partial region 22 and half outside of the positioning marker 20. The color measurement sensor unit 14 accordingly delivers a middle measurement value in the cyan measurement channel and no measurement value or only a very low measurement value in the other color measurement channels.

Given the relative arrangement indicated by the circle 44, the measurement region 12 is arranged half in the cyan-colored partial region 22 and half in the magenta-colored partial region 24, such that a middle measurement value is determined in both the cyan measurement channel and the magenta measurement channel.

Given the relative arrangement indicated by the circle 46, the measurement region 12 is arranged half in the magenta-colored partial region 24 and half in the yellow-colored partial region 26, such that a middle measurement value is determined in both the magenta measurement channel and the cyan measurement channel.

Given the relative arrangement indicated by the circle 48, the measurement region 12 is arranged half in the yellow-colored partial region 26 and half outside the positioning marking 20. A middle measurement value is accordingly determined in the yellow measurement channel.

As is to be learned from the previously presented embodiments for the various possible positionings, the relative position between the positioning marking 20 and the color measurement sensor unit 14—and thus also the relative position between the print marking 16 and the color measurement sensor unit 14—can thus be determined in a simple manner but nevertheless very precisely with the aid of said color measurement sensor unit 14, via the measurement values determined in the individual color measurement channels. Complicated additional sensors (in particular imaging sensors such as cameras) for this can be foregone since all necessary information can be derived from the determined color values or greyscale values.

A section of a printing substrate web 10 on which the positioning marking 20 according to FIG. 4 and four print markings 16 are applied is shown in FIG. 5. The measurement region of a measurement of the color measurement sensor unit 14 is respectively indicated via the circles 50. The printing substrate web 10 is moved in the movement direction 16 so that initially a measurement value is determined in the black-inked printing marking 16, then in the yellow-inked print marking 16, then in the magenta-inked marking 16, and then in the cyan-inked print marking 16.

In FIGS. 5 and 6, a measurement of the color measurement sensor unit 14 with its respective measurement region 12 is respectively depicted by the circles 50. A measurement value is subsequently determined in the position marking 20. Given the example shown in FIG. 5, the measurement region 12 is situated half into the cyan-colored partial region 22 and half in the magenta-colored partial region 24. Since the positioning marking 20 and the print markings 16 are arranged one after another along a line, relative to the movement direction B1, the relative positioning between the print markings 16 and the color measurement sensor unit 14 can be concluded in a simple manner via the determined positioning of the positioning marking 20 relative to the color measurement sensor unit 14. Since the measurement region 12 is situated within the positioning marking 20, and if the print markings 16 have the same width as positioning marking 20, the measurement region 12 in the print markings 16 thus also respectively lies completely within the print marking 16, such that the determined measurement value can be used for the control of the color regulation without compensation.

A section of a printing substrate web 10 according to a second embodiment is depicted in FIG. 6. A first print marking 52 in a first color or greyscale value, then a second print marking 54 in a second color or greyscale value, then a third print marking 56 in a third color or greyscale value, and then a positioning marking 20 that comprises three partial regions 22 (wherein the partial region 22 is inked in the third color or, respectively, greyscale value, the partial region 24 is inked in the second color or greyscale value and the partial region 26 is inked in the first color or greyscale value) are initially viewed one after another in the transport direction P1 on the printing substrate web.

A measurement of the color measurement sensor unit 14 with its respective measurement region 12 is respectively depicted by the circles 50. FIG. 7 shows the signal curve of the color measurement sensor unit 14 given the measurements presented in FIG. 6. In the first measurement—i.e. in the measurement before the first print marking 52, thus the measurement in the unprinted region of the printing substrate web 10—a measurement value W is determined. A measurement value A is determined in the region of the first print marking 52 in the second measurement; a measurement value B is determined in the region of the second print marking 54 in the third measurement; and a measurement value C is determined in the region of the third print marking 56 in the third measurement. In the fifth measurement in the region of the positioning marking 20, the value B is determined again since the measurement region 12 is arranged completely in the second partial region 24 (which is inked in the second color, like the second print marking 54) in the example presented in FIG. 6. The measurement value W is accordingly determined again in the uninked partial region in the subsequent sixth measurement.

If the position of the printing substrate web 10 relative to the color measurement sensor unit 14 were to deviate such that the measurement region 12 is not arranged completely in the second partial region 24 upon measurement of the positioning marking 20, but rather is arranged half in the first partial region 22 and half in the second partial region 24, a measurement value between the values B and C would result as this is indicated by the dashed line 60 in FIG. 7. In contrast to this, if a deviation in the other direction were to take place so that the measurement region 12 is arranged half in the second partial region 24 and half in the third partial region 26, a measurement value between the values B and A results, as this is shown by the dash-dot line 62 in FIG. 7.

A printing substrate web 10 according to a third embodiment is depicted in FIG. 8. Four print markings 16 are again applied in series on the printing substrate web 10, of which one is inked black, one yellow, one magenta-colored and one cyan-colored. A positioning marking 20 is also printed. The different measurements by the color measurement sensor unit 14 are indicated by the circles 50, which different measurements take place in the exemplary embodiment presented in FIG. 8 with a higher frequency compared to the exemplary embodiments presented in FIGS. 5 and 6.

The positioning marker 20 has a first partial region 70 and a second partial region 72, wherein the first partial region 70 and second partial region 72 are separated from one another by a boundary 74 traveling diagonally relative to the movement direction P1 and are inked in different colors. Depending on the relative positioning between the positioning marker 20 and color measurement sensor unit 14, a different measurement value results accordingly so that the relative position can be concluded again in a simple manner via this measurement value.

Alternatively, the boundary 74 can also have a stepped or sinusoidal shape, for example. Any additional shape is likewise possible in which at least one segment of the limit 74 does not travel parallel to the movement direction P1, such that a variation of the relative position between the printing substrate web 10 and the measurement region 12 transverse to the movement direction P1 can be detected via a change of the proportion of the first and second partial region 70, 72 that is detected by the measurement region 12.

An additional schematic depiction of a printing substrate web 10 according to a fourth embodiment is depicted in FIG. 9. As viewed in the movement direction P1, a print marking 80 of a first color and then a print marking 82 of a second color are printed on the printing substrate web 10. A positioning marking 20 subsequently follows that comprises a first partial region 70 of the first color and a second partial region 72 of the second color that are separated from one another via a boundary 74 traveling at an angle relative to the movement direction P1.

A signal curve of the signal of the color measurement sensor unit 14 that results given measurements corresponding to the circles 50 from FIG. 9 is shown in FIG. 10. The value A hereby represents the value that the color measurement sensor unit 14 delivers if the measurement region 12 is arranged entirely within a region of the first color, thus entirely within the first print marking 80, for example. The value B accordingly reflects the value that the color measurement sensor unit 14 delivers if the measurement region 12 is arranged entirely within a region of the second print marking 82 or of the second partial region 72 of the positioning marking 20.

According to FIG. 10, the measurement signal initially increases the value A in the region 90 as long as the measurement region 12 is located entirely on the first print marking 80. The measurement value of the value A subsequently decreases to a value of B corresponding to the diagonal line 92 while the measurement region 12 is, step by step, increasingly arranged less in the region of the first print marking 80 and more in the region of the second print marking 82 until the measurement region 12 is arranged entirely within the region of the second print marking 82, such that the color measurement sensor unit 14 delivers the value B. As long as the measurement region 12 is arranged completely within the second print marking 82, the signal remains at the value B, as this is indicated by the line 94. Given a transition between the second print marking 82 and the first partial region 70 of the positioning marking 20 that is inked in the first color, the measurement value changes again from a value B to a value A corresponding to the line 96. As long as the measurement region 12 is arranged entirely in the first partial region 70 of the positioning marking, the color measurement sensor unit 14 constantly delivers a measurement value A, as this is depicted by the line 98 in the signal curve. Given a transition of the measurement region 12 from the first partial region 70 into the second partial region 74, a change again takes place of the obtained measurement value from a value A to a value B, as this is indicated by the angled line 100 in the signal curve. However, the change between the two partial regions 70, 72 takes places significantly slower (due to the separation line 74 traveling at an angle) than given an abrupt transition between the print markings 80, 82.

As soon as the measurement region 12 is arranged entirely within the second partial region 72 of the positioning marking 20 that is inked in the second color, the color measurement sensor unit 14 in turn constantly delivers a measurement value B, as this is shown by the line 102 in the signal curve in FIG. 10.

In the example shown in FIG. 9, the color measurement sensor unit 14 is arranged in the desired arrangement relative to the printing substrate web 10, meaning that the measurement region 12 is always arranged centrally on the print markings 80, 82 and the positioning marking 20. In contrast to this, if a deviation were present to the left in FIG. 9, the measurement region 12 would already exceed the boundary line 74 upon measurement of the positioning marking 20, such that the value would already vary earlier from the value A to the value B, as this is indicated by the dashed line 104 in the signal curve according to FIG. 10.

In contrast to this, if a shift to the right were present in FIG. 9, the transition between the two partial regions of the positioning marking 20 would only be reached later, as this is shown by the dash-dot signal curve 106 in FIG. 6.

The relative arrangement between the printing substrate web 10 and the color measurement sensor unit 14 can thus also be determined in a simple manner via the positioning marker 20, via the location of the measurement, size of the measurement region 12 and/or the type of the positioning markings.

In alternative embodiments the individual partial region of the positioning marking 20 can be printed in different greyscale values instead of in different colors. In this case, the individual partial regions can also be differentiated in a simple manner with the aid of the color measurement sensor unit 14 since they deliver correspondingly different measurement values depending on their respective greyscale value.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method to control a printer or copier by regulating a color value of a print color, comprising the steps of:
   providing a print marking and a separate non-overlapping positioning marking associated with the print marking on a printing substrate web aligned with each other along a movement direction of the substrate web;
   providing a color measurement unit having a measurement region for determining a color value of the print marking and also with said same color measurement unit a color value of said positioning marking;
   with the web moving in a said movement direction, measuring the color value of the print marking and also measuring the color value of the positioning marking and by use of the positioning marking color value determining whether an undesirable lateral positioning of the printing substrate web has occurred in a lateral direction transverse to the movement direction such that the measurement region of the color measurement unit no longer lies entirely within the print marking;
   if such an undesirable lateral movement has occurred at least one of re-establishing a desired alignment between the color measurement unit and the substrate web in the movement direction, compensating the determined color measurement value of the print marking for an error produced by the undesired lateral positioning, and not using the color measurement value of the print marking at all; and
   controlling the printer or copier while the web is moving to regulate the color value of the print color depending on the measurement color value of the print marking if at least one of the color measurement value and the compensated measurement value of the print marking is used.

2. The method if claim 1 wherein the positioning marking follows after the positioning marking in the movement direction and the color measurement unit first measures the color value of the print marking and thereafter measures the color value of the positioning marking.

3. The method of claim 1 wherein the positioning marking comprises at least two different color partial strips having a longitudinal extent parallel to a side edge of the web.

4. The method according to claim 1 in which the determined relative position between the print marking and the color measurement unit is taken into account in the control of the printer or copier depending on the determined color value of the print marking.

5. The method according to claim 4 in which a deviation between a determined relative position of the print marking and the measurement region of the color measurement unit and a desired position is determined, and in which the color value of the print marking is corrected by said deviation, or the determined color value of the print marking is not taken into account in the control of the printer or copier if the deviation exceeds a predetermined maximum allowable deviation.

6. The method according to claim 1 in which the positioning marking has two different color partial strips and a separating line between the two different color partial strips is at an angle relative to the movement direction.

7. The method according to claim 1 in which:
   the positioning marking has two different color partial strips;
   the two different color partial strips of the positioning marking are designed such that they are differentiated from one another via, in addition to the color value, at least one additional differentiation criteria that is measured with aid of the color measurement unit;
   at least one real value of the additional differentiation criterion is determined with aid of the color measurement unit if the measurement region of the color measurement unit is arranged in the region of the positioning marking; and
   a relative position between the print marking and the color measurement unit is determined depending on the real color value of the additional determined real value.

8. The method according to claim 3 in which the two different color partial strips are stripe-shaped and travel parallel to one another and parallel to the movement direction.

9. The method according to claim 8 in which the positioning marking comprises an additional stripe-shaped partial strip that is printed in a different color than the other two partial strips and that travels parallel to the other partial strips.

10. The method according to claim 3 in which the partial regions are printed in print colors of the printer or copier.

11. The method according to claim 8 in which a width of the partial strips is based on a diameter of the measurement region of the color measurement unit.

12. The method according to claim 1 in which the print marking and the positioning marking are printed in a predetermined position relative to one another as seen in the movement direction of the printing substrate web.

* * * * *